United States Patent
Benco et al.

(10) Patent No.: US 7,792,535 B2
(45) Date of Patent: Sep. 7, 2010

(54) ENHANCED MOBILE STATION PAGING IN A WIRELESS TELECOMMUNICATIONS NETWORK

(75) Inventors: David S. Benco, Winfield, IL (US);
Paresh C. Kanabar, Naperville, IL (US); John C. V. Nguyen, Naperville, IL (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 671 days.

(21) Appl. No.: 11/141,104

(22) Filed: May 31, 2005

(65) Prior Publication Data

US 2006/0270422 A1 Nov. 30, 2006

(51) Int. Cl.
*H04W 68/00* (2009.01)
(52) U.S. Cl. .................. 455/458; 455/466; 455/450; 455/447; 370/328; 370/338
(58) Field of Classification Search ............... 455/458, 455/466, 450, 447; 370/328, 338
See application file for complete search history.

(56) References Cited

U.S. PATENT DOCUMENTS

| | | | | |
|---|---|---|---|---|
| 5,533,094 A | * | 7/1996 | Sanmugam | 455/426.1 |
| 5,729,540 A | * | 3/1998 | Wegrzyn | 370/336 |
| 5,974,325 A | * | 10/1999 | Kotzin et al. | 455/450 |
| 6,026,306 A | * | 2/2000 | Foladare et al. | 455/456.5 |
| 6,236,649 B1 | * | 5/2001 | Jun | 370/343 |
| 6,404,775 B1 | * | 6/2002 | Leslie et al. | 370/466 |
| 7,079,550 B2 | * | 7/2006 | Padovani et al. | 370/468 |
| 7,366,525 B2 | * | 4/2008 | Drury et al. | 455/458 |
| 2003/0162553 A1 | * | 8/2003 | Huang et al. | 455/458 |

* cited by examiner

*Primary Examiner*—Nghi H Ly
(74) *Attorney, Agent, or Firm*—Fay Sharpe LLP

(57) ABSTRACT

A method is provided for paging a mobile station (40) served by a wireless telecommunications network (A). The method includes: using a plurality of band-classes to selectively communicate with the mobile station (40); remembering which one of the plurality of band-classes was last used to communicate with the mobile station (40); and, selectively paging the mobile station (40) over the wireless telecommunications network (A) when the mobile station (40) is being sought, the paging covering at least the remembered band-class for the mobile station (40) being paged.

7 Claims, 1 Drawing Sheet

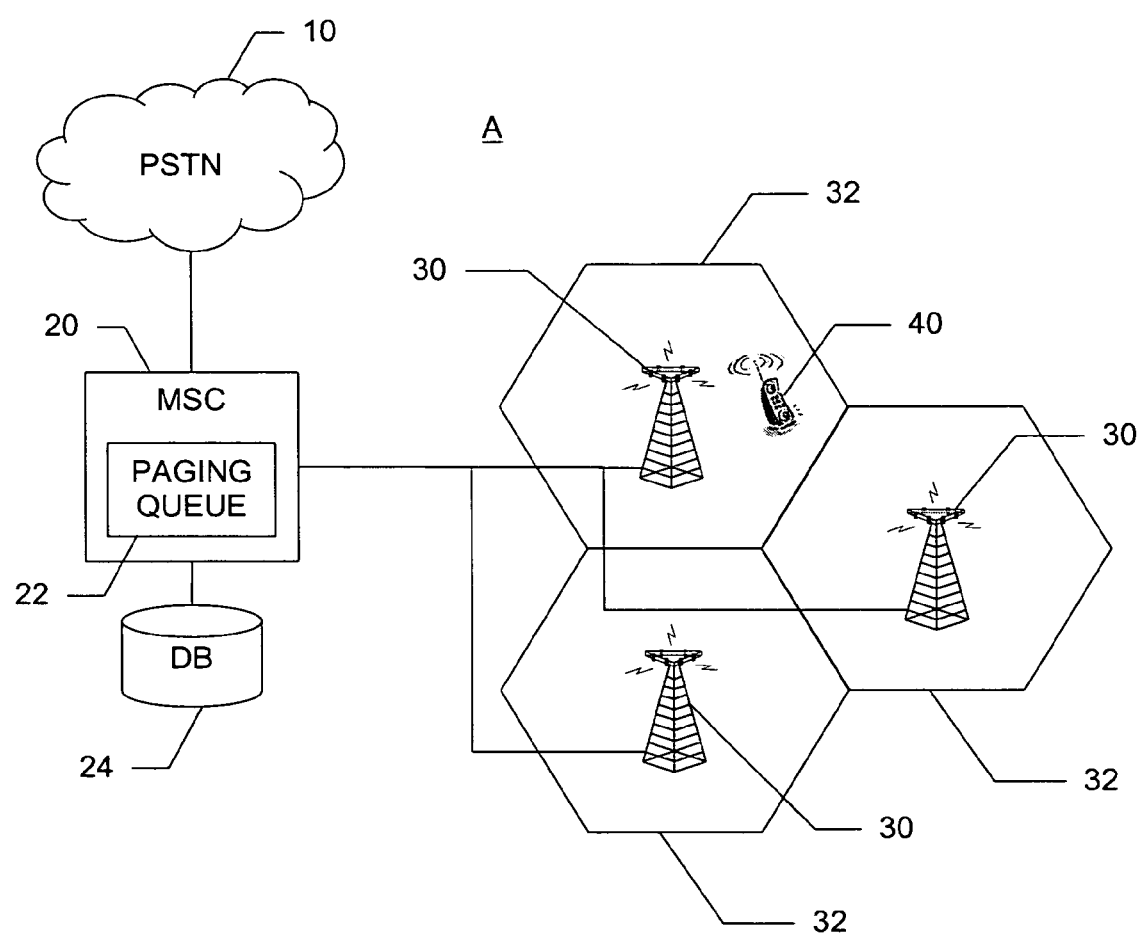

ENHANCED MOBILE STATION PAGING IN A WIRELESS TELECOMMUNICATIONS NETWORK

FIELD

The present inventive subject matter relates to the wireless or mobile telecommunications arts. Particular application is found in conjunction with paging a mobile station (MS), and the specification makes particular reference thereto. However, it is to be appreciated that aspects of the present inventive subject matter are also amenable to other like applications.

BACKGROUND

Wireless or mobile telecommunications networks are generally known in the art. A MS (e.g., a mobile telephone or other mobile or wireless end user device) obtains service and/or access to the wireless network via an over-the-air radio frequency (RF) interface with a base station (BS). Each BS provides the over-the-air interface for and/or serves a particular geographic coverage area known as a cell. Typically, a plurality of base stations are operatively connected to and/or served by a mobile switching center (MSC) that is responsible for routing traffic for a particular MS to the appropriate BS currently serving that MS (i.e., to the cell in which the MS is currently located).

Typically, within a wireless telecommunications network, the over-the-air interfaces used to communicate between the MS and BS may includes multiple band-classes. For example, two frequently used band-classes include the so called cellular band-class operating at or around 850 MHz and the so called personal communications service (PCS) or digital cellular band-class operating at or around 1900 MHz. Commonly, a MS is equipped to selectively employ either band-class when communicating with a BS depending on various circumstances, e.g., such as the availability of either band-class in a particular geographic location where the MS is currently located.

The "mobility" in mobile communications is commonly achieved in part via two communication channels with the MS, namely, a paging channel and an access channel. The paging channel is used to verify and/or establish the location of the MS within the network and to deliver incoming calls to the MS. The access channel is used by the MS for registration purposes, i.e., to report power-up of the MS, to report changes in the location of the MS, etc.

Typically, a mobile service provider seeks to maximize the number of busy hour call attempts (BHCA) in order to serve an increasing number of mobile subscribers. One obstacle to achieving this goal, however, is the availability of sufficient paging channel bandwidth. While there are known ways to increase paging capacity, they often involve considerable expense and/or lead time, e.g., adding new bandwidth. Accordingly, it is desirable to optimize the usage of existing paging channel bandwidth.

Historically, when an incoming call arrived at a MSC for a MS, all the band-classes employed would be paged in order to contact the MS and deliver the call. That is to say, the MSC would signal the base stations it served to transmit a paging signal in all the band-classes to verify or establish the location of the MS within one of the cells. This approach, however, used a considerable amount of paging channel bandwidth insomuch as, traditionally, all the cells within the geographic region served by the MSC and all the band-classes where paged for any given instance.

In recent developments, it has been proposed to conserve paging channel bandwidth by suitably limiting or defining the geographic regions or cells that are paged in any given instance using one or more of a combination of techniques. See, for example, U.S. patent application Ser. No. 11/090,500, filed Mar. 25, 2005 and U.S. patent application Ser. No. 11/065,504, filed Mar. 24, 2005, both incorporated by reference herein in their entirety. However, there still remains the desire to further reduce the paging channel load in order to support more mobiles and/or more services.

Moreover, even with effective conservation efforts, the paging channel may still be susceptible to becoming overloaded. Reducing the paging channel load does not address certain issues that can still arise if and/or when such an overload condition is reached or approached. Customarily, when a system is in paging overload, paging messages are dropped indiscriminately. For example, if there is no available paging channel bandwidth when an MSC receives a paging message or is otherwise processing a request or attempt to page a MS, then that paging message or request or attempt is simply dropped or ignored such that no page is made. Accordingly, the corresponding call will not be completed to the MS. Such an indiscriminate procedure will typically not result in the most efficient or desirable use of valuable paging channel bandwidth.

Accordingly, a new and improved paging system and/or method for a wireless telecommunications network is disclosed that overcomes the above-referenced problems and others.

SUMMARY

In accordance with one embodiment, a method is provided for paging a mobile station served by a wireless telecommunications network. The method includes: using a plurality of band-classes to selectively communicate with the mobile station; remembering which one of the plurality of band-classes was last used to communicate with the mobile station; and, selectively paging the mobile station over the wireless telecommunications network when the mobile station is being sought, the paging covering at least the remembered band-class for the mobile station being paged.

In accordance with another aspect, a method for paging mobile stations served by a wireless telecommunications network includes: assigning a priority level to a paging attempt for a mobile station; queuing-up a plurality of pending paging attempts according to their assigned priority level; and, executing the paging attempts in the order queued-up.

Numerous advantages and benefits of the inventive subject matter disclosed herein will become apparent to those of ordinary skill in the art upon reading and understanding the present specification.

BRIEF DESCRIPTION OF THE DRAWINGS

The present inventive subject matter may take form in various components and arrangements of components, and in various steps and arrangements of steps. The drawings are only for purposes of illustrating example embodiments and are not to be construed as limiting. Further, it is to be appreciated that the drawings are not to scale.

The FIGURE is a diagram illustrating a telecommunications network suitable for practicing aspects of the present inventive subject matter.

DETAILED DESCRIPTION OF PREFERRED EMBODIMENTS

For clarity and simplicity, the present specification shall refer to structural and/or functional elements, entities and/or facilities, relevant communication standards, protocols and/or services, and other components and features that are commonly known in the telecommunications art without further detailed explanation as to their configuration or operation except to the extent they have been modified or altered in accordance with and/or to accommodate the embodiment(s) presented herein.

With reference to the FIGURE, a telecommunications network A includes a public switched telephone network (PSTN) 10 operatively connected to and/or in communication with a MSC 20 in the usual manner. The MSC 20 is operatively connected to and/or in communication with a plurality of base stations 30 in the usual manner. As is understood in the art, each BS 30 provides an over-the-air radio frequency interface for its respective geographic area or cell 32. Selectively, a MS (such as the exemplary MS 40 illustrated) is provided telecommunication services and/or otherwise accesses the network A via the interface and/or BS 30 serving the cell 32 in which the MS 40 is located. In the usual manner two communication channels are selectively employed between the BS 30 and the MS 40, namely, a paging channel and an access channel. The paging channel is used to verify and/or establish the location of the MS 40 within the network A and to deliver incoming calls to the MS 40. The access channel is used by the MS 40 for registration purposes, i.e., to report power-up of the MS 40, to report changes in the location of the MS 40, etc.

Suitably, the MSC 20, the BS 30 and the MS 40 support and/or are equipped for operation in a plurality (i.e., two or more) of band-classes. For each cell access event (described later herein), a selected one of the plurality of band-classes is used to communicate with the MS 40. For example, the plurality of band-classes supported include a first band-class (e.g., the cellular band-class operating at or around 850 MHz) and a second band-class (e.g., the PCS or digital cellular band-class operating at or around 1900 MHz).

While only one MSC is illustrated in the FIGURE for purposes of simplification and clarity, it is to be appreciated that the network A may in fact include any number of one or more MSCs that are similarly situated and/or arranged. Additionally, while three BS 30 and three corresponding cells 32 are illustrated in the FIGURE, it is to be appreciated that more or less than three base stations and/or cells may be similarly situated with respect to any of the one or more MSCs in the network A. That is to say, each MSC in the network A may optionally serve any number of one or more base stations and/or corresponding cells. Additionally, while only one exemplary MS is illustrated in the FIGURE, the network A optionally serves any number of one or more mobile stations similarly situated and/or arranged in any of the one or more cells 32.

Suitably, as the MS 40 travels, it registers its current location with the MSC 20 each time crosses a defined registration boundary. For example, the MS 40 registers with the MSC 20 serving its location by sending a registration signal to the MSC 20 using the access channel. In this manner, the MSC 20 is able to remember the most recent geographic area from which the MS 40 registered. For example, the MSC 20 may store the last known registration information (including, e.g., the identity of the geographic area from which the MS 40 last registered) in a location register or database 24.

In addition, the last or most recent band-class used to communicate with the MS 40 during a cell access event is also monitored by the network A. The identity of this band-class is optionally stored or maintained along with and/or as part of the information in the database 24. Cell access events include those events where the MS 40 accesses a cell 32, i.e., the MS 40 sends, receives or otherwise exchanges a transmission to, from or with a BS 30. For example, a cell access event may include, registration of the MS 40, the MS 40 receiving an incoming call, the MS 40 placing an outgoing call, the transmission of packet data to or from the MS 40, receipt or transmittal of a message using short-message-service (SMS), etc. For each of these activities, the network A is able to determine which band-class is being used to communicate with the MS 40. Suitably, the identity of this band-class is captured and/or updated at each cell access event, e.g., by the MSC 20. A time and/or date stamp for each of these captures and/or updates is also optionally maintained in the database 24. In this manner, it can be determined how old the identity of the last used band-class is for the particular MS 40.

When the MS 40 is being sought by the network A (e.g., when an incoming call arrives at the MSC 20 for the MS 40), an appropriate page is sent out for the MS 40 via the paging channel. Suitably, a paging protocol is used that depends upon the information stored in the location register or database 24. For example, to conserve paging channel bandwidth, the MS 40 is optionally paged in only one band-class, namely, the band-class identified in the database 24, i.e., the band-class used to communicate with the MS 40 during the last or most recent cell access event. Of course, depending upon if and/or when the page is answered, multiple pages may be attempted.

Optionally, the paging protocol and/or each paging attempt is selectively configurable, e.g., by a wireless service provider or other operator of the MSC 20. For example, in one optional configuration, a paging attempt may be designated or selected by the service provider to cover a limited number of selected band-classes, or in an alternate optional configuration, the paging attempt may be designated or selected by the service provider to cover all the supported band-classes. In an exemplary embodiment, a paging protocol is employed that, upon successive attempts, progressively expands the paging coverage with respect to the number of band-classes paged. Suitably, a first relatively narrower paging attempt covers less than all the supported band-classes, while a second relatively broader paging attempt covers all the supported band-classes.

The paging decision is also optionally based upon the age of the information in the database 24. Older information may not be as indicative or predictive of current conditions as newer information. The paging protocol is therefore optionally tailored accordingly. For example, if the MS 40 is deemed to have used a particular band-class in connection with a cell access event relatively recently (i.e., within some threshold time period), then a paging attempt is merely sent out to cover the band-class stored and/or identified in the database 24, and optionally, if the MS 40 is deemed to have used a particular band-class in connection with a cell access event relatively long ago (i.e., outside the threshold time period), then the paging attempt is sent out to cover some larger number of supported band-classes, e.g., the entire plurality of supported band-classes.

Additionally, the MSC 20 is equipped and/or provisioned to manage and/or regulate the order and/or priority of paging in a discriminating fashion so as to utilize the available paging channel bandwidth as desired. Suitably, relatively higher priority paging attempts are executed or provided paging channel bandwidth ahead of relatively lower priority paging attempts. Accordingly, when paging overload conditions exist or when available paging channel bandwidth is limited, those paging attempts deemed more important receive priority treatment. Conversely, those paging attempts deemed less important are allowed to be pre-empted, and eventually they are the first ones that are allowed to be dropped if the paging congestion is not sufficiently relieved in a suitable amount of time.

As shown in the FIGURE, the MSC 20 is equipped with, provisioned with and/or otherwise has access to a paging queue 22 in which are queued-up paging requests or pending paging attempts to be processed and/or executed by the MSC 20 so as to effect the paging of various mobile stations. Suitably, each paging request or pending attempt is assigned a priority level or value by the MSC 20, and they are arranged in the queue 22 according to their relative priority. The paging requests or pending attempts are processed by the MSC 20 in order out of the queue 22 from the highest priority level to the lowest priority level, e.g., with all pending attempts assigned a higher priority level being processed before those assigned to the next lower priority level. Suitably, as a new paging attempt is received or otherwise being entered into the queue 22, it jumps ahead or in front of or otherwise pre-empts those already in the queue 22 with relatively lower priority levels. The paging attempts are processed out of the queue 22 in turn, e.g., one after another, so long as the paging channel bandwidth and/or other paging resources remain available and/or open, otherwise processing of the next pending attempt is delayed until the paging channel bandwidth and/or or paging resources are freed up to handle the resulting page, at which point the next pending attempt in the queue 22 is acted upon. Suitably, as the queue 22 reaches or nears it capacity, the lowest priority attempts pending therein are dropped from the queue 22. Similarly, those pending attempts that are sufficiently old (i.e., that have been in the queue 22 for longer than a defined amount of time) are also optionally dropped from the queue 22.

In an exemplary embodiment, the priority levels for the paging requests or pending attempts maintained in the queue 22 are selectively assigned based to varying degrees upon one or more characteristics of the request/attempt. Suitably, the particular characteristics used and the weight they are given is selectively chosen and/or adjustable to achieve one or more particular goals, such as, maximizing a page response rate or the likelihood that the paged MS will answer or respond to a page, maximizing potential revenues per page attempt, etc. For example, being that the page response rate is generally higher for first paging attempts as opposed to subsequent paging attempts, suitably, a first paging attempt is optionally given a higher priority level than a second or subsequent pending attempt. That is to say, the priority level assigned to a pending page attempt depends upon the attempt number. In another example, voice calls may be generally greater revenue producers than SMS calls. Accordingly, a pending page attempt for a voice call is optionally given a higher priority level than a pending page attempt for an SMS call. That is to say, the priority level assigned to a pending page attempt depends upon the type of call the page is for, e.g., voice, SMS, etc. Suitably, the priority level assigned to each pending page attempt that is maintained in the queue 22 is based upon some weighted combination of both the attempt number and the call type.

It is to be appreciated that in connection with the particular exemplary embodiments presented herein certain structural and/or function features are described as being incorporated in defined elements and/or components. However, it is contemplated that these features may, to the same or similar benefit, also likewise be incorporated in other elements and/or components where appropriate. It is also to be appreciated that different aspects of the exemplary embodiments may be selectively employed as appropriate to achieve other alternate embodiments suited for desired applications, the other alternate embodiments thereby realizing the respective advantages of the aspects incorporated therein.

It is also to be appreciated that particular elements or components described herein may have their functionality suitably implemented via hardware, software, firmware or a combination thereof. Additionally, it is to be appreciated that certain elements described herein as incorporated together may under suitable circumstances be stand-alone elements or otherwise divided. Similarly, a plurality of particular functions described as being carried out by one particular element may be carried out by a plurality of distinct elements acting independently to carry out individual functions, or certain individual functions may be split-up and carried out by a plurality of distinct elements acting in concert. Alternately, some elements or components otherwise described and/or shown herein as distinct from one another may be physically or functionally combined where appropriate.

In short, the present specification has been set forth with reference to preferred embodiments. Obviously, modifications and alterations will occur to others upon reading and understanding the present specification. It is intended that the invention be construed as including all such modifications and alterations insofar as they come within the scope of the appended claims or the equivalents thereof.

What is claimed is:

1. A method for paging a mobile station served by a wireless telecommunications network, the method comprising:
   (a) using a plurality of band-classes to selectively communicate with the mobile station;
   (b) remembering which one of the plurality of band-classes was last used to communicate with the mobile station;
   (c) receiving a paging request for communication with the mobile station;
   (d) assigning a priority level to the paging request,
   (e) selectively communicating a paging attempt to the mobile station in response to the paging request, said paging attempt covering at least the remembered band-class for the mobile station being paged and based at least in part on the corresponding priority level;
   (f) repeating steps (a) through (e) for a plurality of mobile stations.

2. The method of claim 1, wherein at least one paging attempt covers less than all of the plurality of band-classes.

3. The method of claim 1, wherein the plurality of band-classes includes a first band-class and a second band-class.

4. The method of claim 3, wherein the first band class operates at about 850 MHz and the second band-class operates at about 1900 MHz.

5. The method of claim 1, wherein a plurality of paging requests remain pending for a period of time prior to paging attempts to the corresponding mobile stations, said method further comprises:

entering the pending paging requests in a queue, said pending paging requests being ordered therein according to their assigned priority level.

6. The method of claim 1, wherein multiple paging attempts are selectively communicated to at least one mobile station being sought and the priority level is assigned based upon an attempt number for the corresponding page request.

7. The method of claim 1, wherein the mobile stations are being sought to connect different types of calls thereto and the priority level for each paging request is assigned based upon the type of call for which the corresponding mobile station is being sought.

\* \* \* \* \*